United States Patent
Tsai et al.

(10) Patent No.: US 9,172,153 B2
(45) Date of Patent: Oct. 27, 2015

(54) GROUNDING MEMBER AND MOUNTING APPARATUS FOR HARD DISK DRIVE

(71) Applicant: ENNOCONN CORPORATION, New Taipei (TW)

(72) Inventors: Ching-Hsiang Tsai, New Taipei (TW); Shih-Chi Liu, New Taipei (TW)

(73) Assignee: ENNOCONN CORPORATION, New Taipei (TW)

( * ) Notice: Subject to any disclaimer, the term of this patent is extended or adjusted under 35 U.S.C. 154(b) by 56 days.

(21) Appl. No.: 14/055,891

(22) Filed: Oct. 17, 2013

(65) Prior Publication Data

US 2015/0077921 A1    Mar. 19, 2015

(30) Foreign Application Priority Data

Sep. 18, 2013   (TW) .................................. 102133820

(51) Int. Cl.
  *G06F 1/16*  (2006.01)
  *H01R 4/66*  (2006.01)
  *G06F 1/18*  (2006.01)
  *G11B 33/12*  (2006.01)

(52) U.S. Cl.
  CPC ........ *H01R 4/66* (2013.01); *G06F 1/187* (2013.01); *G11B 33/124* (2013.01); *G11B 33/128* (2013.01)

(58) Field of Classification Search
  USPC ....................................... 361/679.33–679.37
  See application file for complete search history.

(56) References Cited

U.S. PATENT DOCUMENTS

| | | | |
|---|---|---|---|
| 4,554,400 A | 11/1985 | Schmalzl | |
| 6,069,789 A * | 5/2000 | Jung | 361/679.32 |
| 6,249,432 B1 * | 6/2001 | Gamble et al. | 361/679.35 |
| 6,421,236 B1 * | 7/2002 | Montoya et al. | 361/679.58 |
| 6,652,314 B2 * | 11/2003 | Tournadre | 439/536 |
| 6,813,159 B2 * | 11/2004 | Irie et al. | 361/752 |
| 7,057,890 B2 * | 6/2006 | Chang | 361/679.32 |
| 7,148,418 B2 * | 12/2006 | Ku et al. | 361/752 |
| 7,221,565 B2 * | 5/2007 | Ko | 361/679.34 |
| 7,280,352 B2 * | 10/2007 | Wilson et al. | 361/679.33 |
| 7,486,509 B2 * | 2/2009 | Kim et al. | 361/679.34 |
| 7,495,904 B2 * | 2/2009 | Liang et al. | 361/679.39 |
| 7,679,896 B2 * | 3/2010 | Deng et al. | 361/679.33 |
| 7,701,707 B2 * | 4/2010 | Peng et al. | 361/679.37 |
| 7,848,096 B2 * | 12/2010 | Peng et al. | 361/679.33 |

(Continued)

FOREIGN PATENT DOCUMENTS

| | | |
|---|---|---|
| CN | 201315163 Y | 9/2009 |
| DE | 3328395 A1 | 2/1985 |

(Continued)

*Primary Examiner* — Adrian S Wilson
(74) *Attorney, Agent, or Firm* — Novak Druce Connolly Bove + Quigg LLP (57) ABSTRACT

A mounting apparatus is used to mount a hard disk drive to a storage rack. The mounting apparatus includes a supporting frame and two grounding members. The supporting frame includes a handle, and two side brackets extending from opposite ends of the handle, and attached to opposite sides of the hard disk drive. Each grounding member is made of resilient and conductive material, and includes a mounting plate mounted to the side bracket, and two abutting plates extending out from two opposite ends of the mounting plate. A part of each abutting plate is exposed out of the corresponding side bracket. when the mounting apparatus mounting the hard disk drive in a storage rack, the abutting plates are sandwiched between the storage rack and the hard disk drive.

13 Claims, 7 Drawing Sheets

(56) References Cited

U.S. PATENT DOCUMENTS

| | | | |
|---|---|---|---|
| 8,259,441 B2* | 9/2012 | Chuang | 361/679.31 |
| 8,310,827 B2* | 11/2012 | Huang et al. | 361/679.37 |
| 8,369,077 B2* | 2/2013 | Peng et al. | 361/679.33 |
| 8,411,432 B1* | 4/2013 | Zimlin et al. | 361/679.55 |
| 8,556,219 B2* | 10/2013 | Li et al. | 248/220.21 |
| 8,749,966 B1* | 6/2014 | Boudreau et al. | 361/679.33 |
| 2004/0105229 A1* | 6/2004 | Wang et al. | 361/685 |
| 2005/0063152 A1* | 3/2005 | Chen et al. | 361/685 |
| 2007/0030639 A1 | 2/2007 | Ko | |
| 2008/0089021 A1 | 4/2008 | Deng et al. | |
| 2008/0098021 A1* | 4/2008 | Harada et al. | 707/101 |
| 2008/0157638 A1* | 7/2008 | Liu et al. | 312/223.2 |
| 2008/0158810 A1* | 7/2008 | Liu et al. | 361/685 |
| 2009/0059507 A1* | 3/2009 | Peng et al. | 361/685 |
| 2009/0103252 A1* | 4/2009 | Peng et al. | 361/679.4 |
| 2009/0129009 A1* | 5/2009 | Zhang et al. | 361/679.34 |
| 2009/0141457 A1* | 6/2009 | Fujikawa | 361/727 |
| 2009/0167124 A1* | 7/2009 | Lee et al. | 312/223.2 |
| 2010/0187957 A1* | 7/2010 | Liang | 312/223.2 |
| 2011/0017887 A1* | 1/2011 | Chang | 248/220.31 |
| 2011/0128696 A1* | 6/2011 | Weng | 361/679.35 |

FOREIGN PATENT DOCUMENTS

| | | |
|---|---|---|
| JP | 56-112999 U1 | 8/1981 |
| TW | M457953 U1 | 7/2013 |

* cited by examiner

GROUNDING MEMBER AND MOUNTING APPARATUS FOR HARD DISK DRIVE

BACKGROUND

1. Technical Field

The present disclosure relates to a mounting apparatus for hard disk drives.

2. Description of Related Art

Electronic devices, such as computers, are generally equipped with a data storage device, such as a hard disk drive. Mounting the storage device to the electronic device by traditional screw type fasteners is inefficient and always requires tools, and the hard disk drive cannot be effectively grounded.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
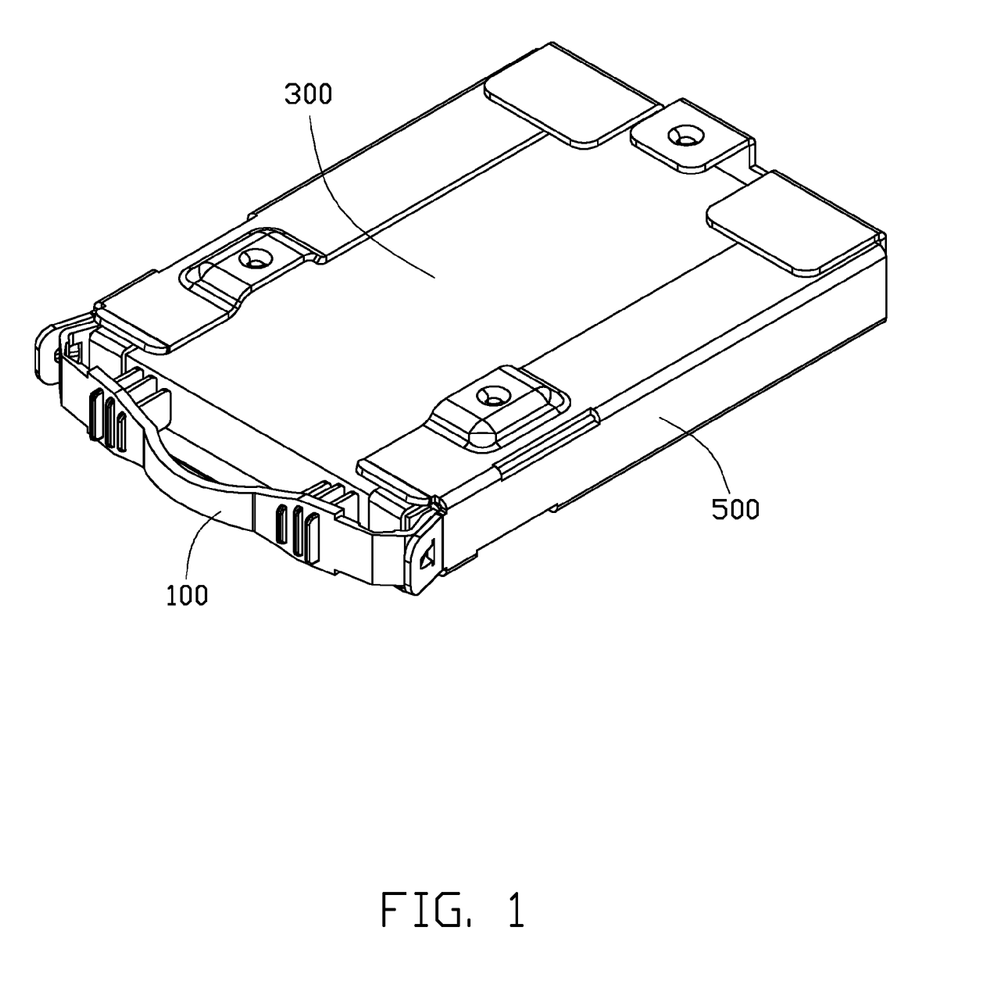
FIG. 1 is an isometric, assembled view of an exemplary embodiment of a mounting apparatus, a hard disk drive, and a storage rack.

FIG. 1 shows an exemplary embodiment of a mounting apparatus 100. The mounting apparatus 100 is used to mount a hard disk drive 300 to a storage rack 500.

Figure 2:
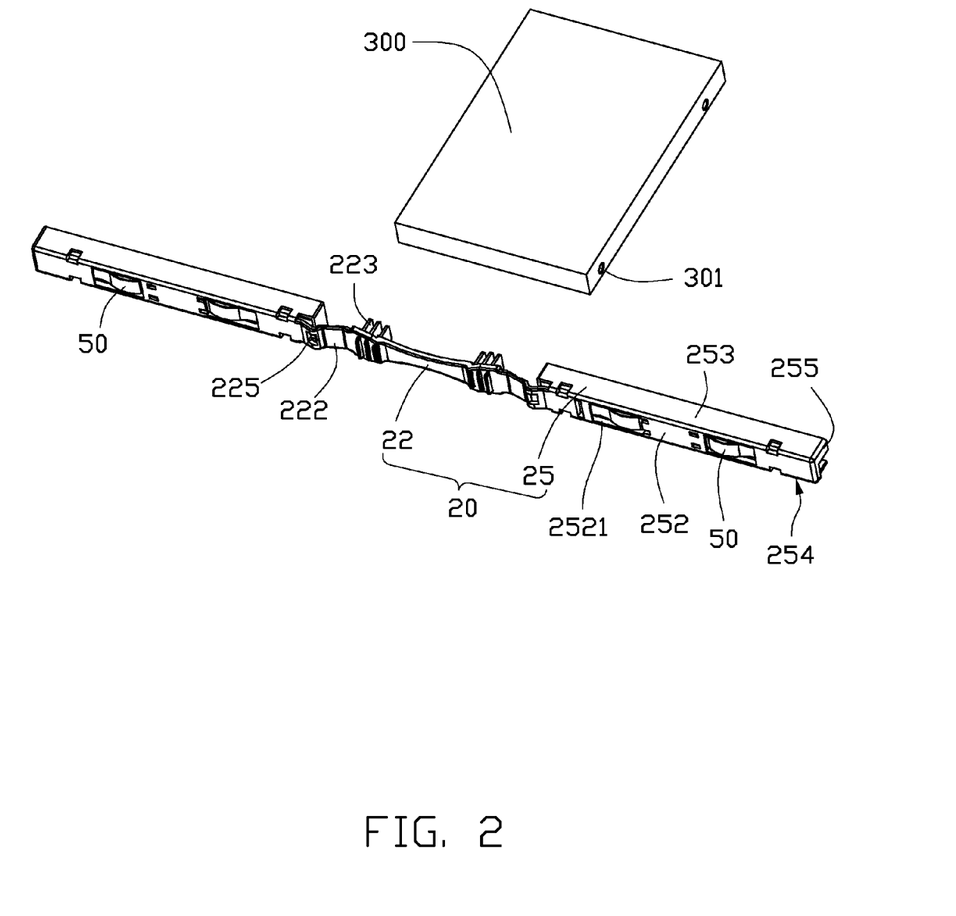
FIG. 2 is an isometric, exploded view of the mounting apparatus and the hard disk drive of FIG. 1.
Figure 3:
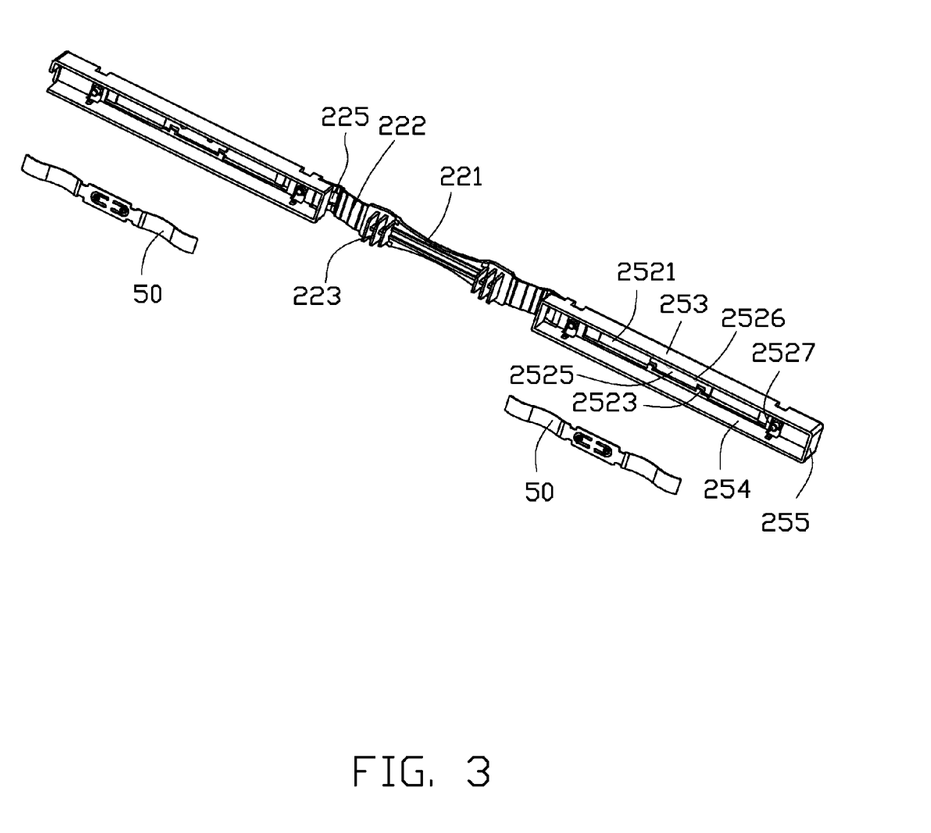
FIG. 3 is an isometric, exploded view of the mounting apparatus of FIG. 2, but viewed from another perspective, wherein the mounting apparatus includes two grounding members.

FIGS. 2 and 3 show the mounting apparatus 100 and the hard disk drive 300. Two fixing holes 301 are defined in each opposite side of the hard disk drive 300 defines. The mounting apparatus 100 includes a supporting frame 20 and two grounding members 50.

The supporting frame 20 is made of elastic material, such as plastic or nylon, and includes a handle 22 and two lengthwise side brackets 25 extending from two opposite ends of the handle 22. The side brackets 25 are in alignment with each other when the supporting frame 20 is restored. Therefore, the supporting frame 20 can be compactly stored to save space during transportation.

Each side bracket 25 includes a sidewall 252, an upper wall 253 perpendicularly extending from a top side of the sidewall 252, a lower wall 254 perpendicularly extending from a bottom side of the sidewall 252 in a same direction with the upper wall 253. In addition, two end walls 255 extending from opposite ends of the sidewall 252 and connected between corresponding ends of the upper and lower walls 253 and 254. A distance between inside surfaces of the upper and lower walls 253 and 254 is slightly less than a height of the hard disk drive 300. A distance between inside surfaces of the end walls 255 is slightly less than a length of the hard disk drive 300. Two ends of each sidewall 252 define two through slots 2521. Two pairs of latching pieces 2523 are formed inside each sidewall 252. The latching pieces 2523 are parallel to the sidewall 252, and the latching pieces 2523 and the sidewall 252 cooperatively bound a mounting slot 2525. A middle of the inside surface of each sidewall 252 defines two positioning holes 2526 positioned between the latching pieces 2523. Two positioning pins 2527 extend from the inside surface of the sidewall 252. The handle 22 includes an arc-shaped grip 221, and two arc-shaped connection portions 222 extending from opposite ends of the grip 221 and connected to the corresponding side bracket 25. A plurality of abutting blocks 223 is formed on the inside surface of the grip 221, adjacent to each of the connection portions 222. Each connection portion 222 defines a locking hole 225.

Figure 4:
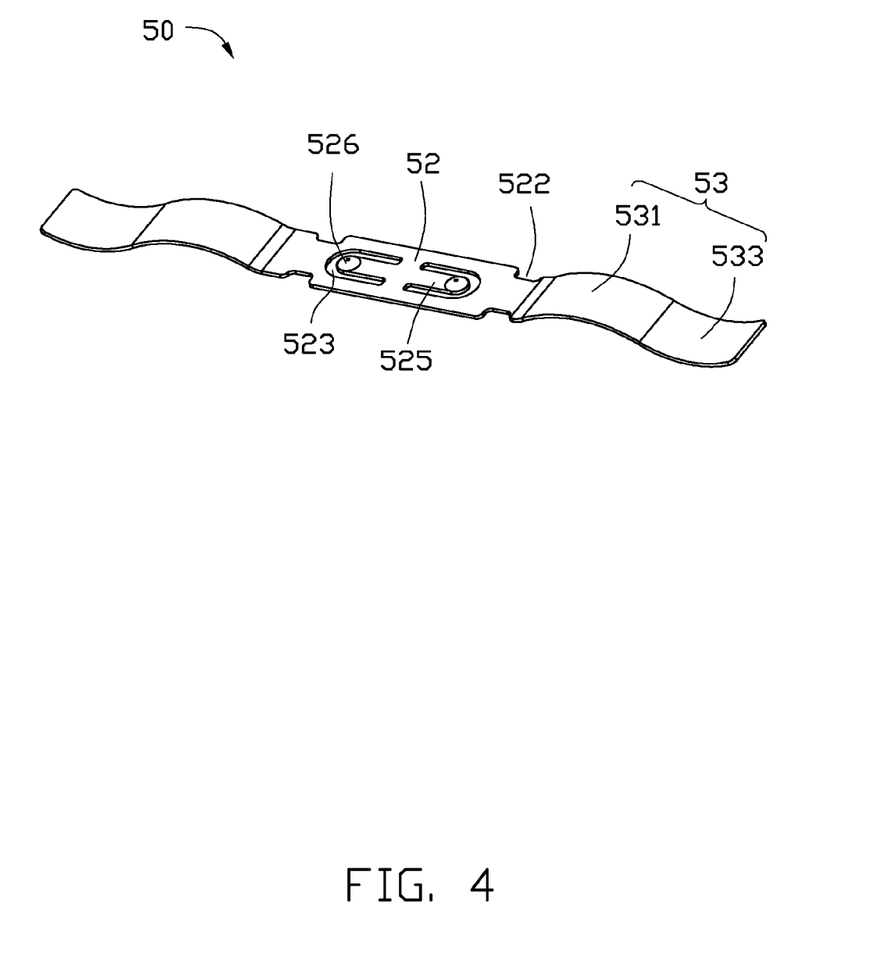
FIG. 4 is an enlarged view of one of the grounding members of FIG. 3, but viewed from another perspective.

FIG. 4 shows one of the grounding members 50 are made of resilient and conductive material. The grounding member 50 includes a substantially rectangular mounting plate 52 and two S-shaped abutting plates 53 extending out from two opposite ends of the mounting plate 52. Two opposite sides of the mounting plate 52 define two pairs of cutouts 522 adjacent to the abutting plates 53. Two opposite ends of the mounting plate 52 define two receiving slots 523 extending along the lengthwise direction of the mounting plate 52. A resilient tongue 525 extends into each receiving slot 523 from an end wall bounding the receiving slot 523 adjacent to a middle portion of the mounting plate 52. A hemispherical protrusion 526 extends out from a distal end of the tongue 525. Each abutting plate 53 includes an arc-shaped first abutting portion 531 extending from the mounting plate 52 arcing toward a first direction, and an arc-shaped second abutting portion 533 extending from a distal end of the first abutting portion 531 arcing toward a second direction opposite to the first direction.

Figure 7:
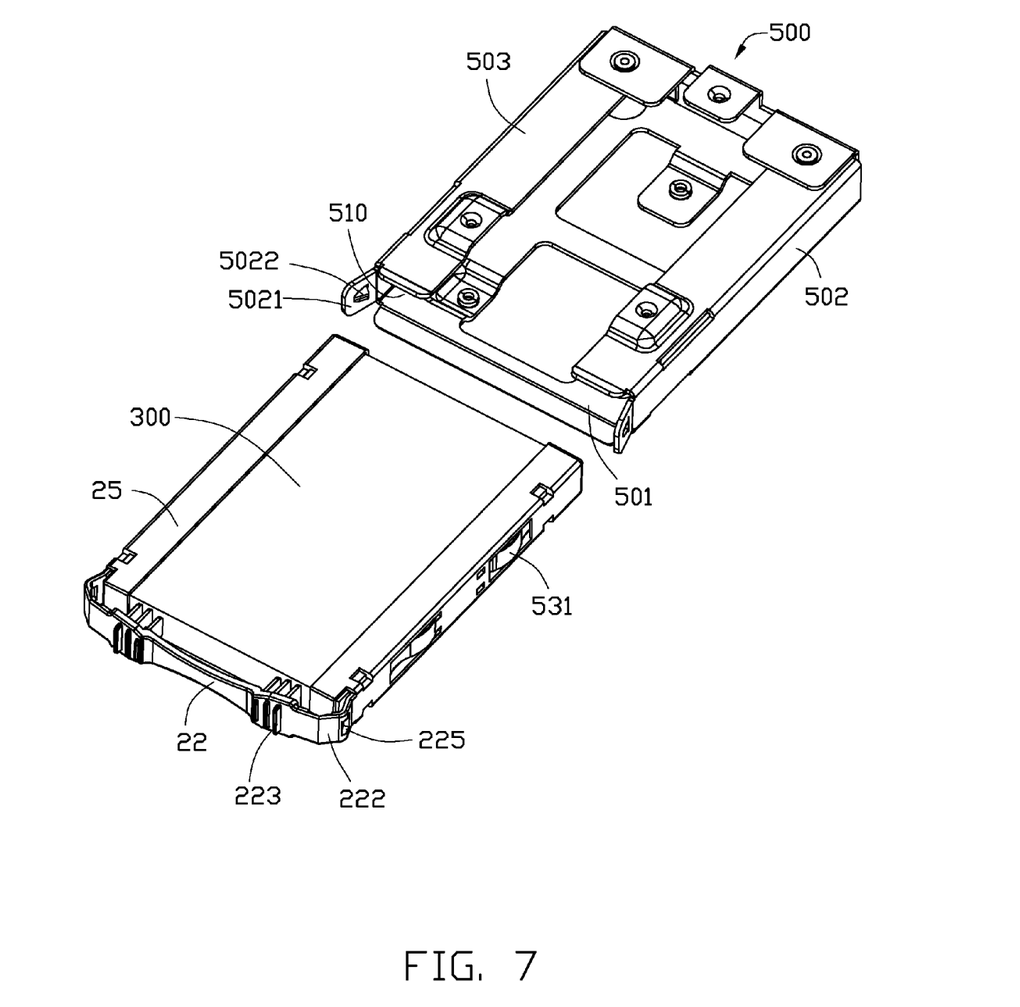
FIG. 7 is a partially exploded view of FIG. 1.

FIG. 7 shows the storage rack 500 includes a bottom plate 501, two side plates 502 perpendicularly extending up from opposite sides of the bottom plate 501, and two top plates 503 perpendicularly extending from tops of the side plates 502 towards each other. The storage rack 500 defines an access 510 in a front end of the storage rack 500. A locking portion 5021 extends from a front end of each of the side plates 502 slantingly away from the other side plate 502. A protrusion 5022 protrudes inwards from each of the locking portions 5021. The storage rack 500 is made of conductive material.

Figure 5:
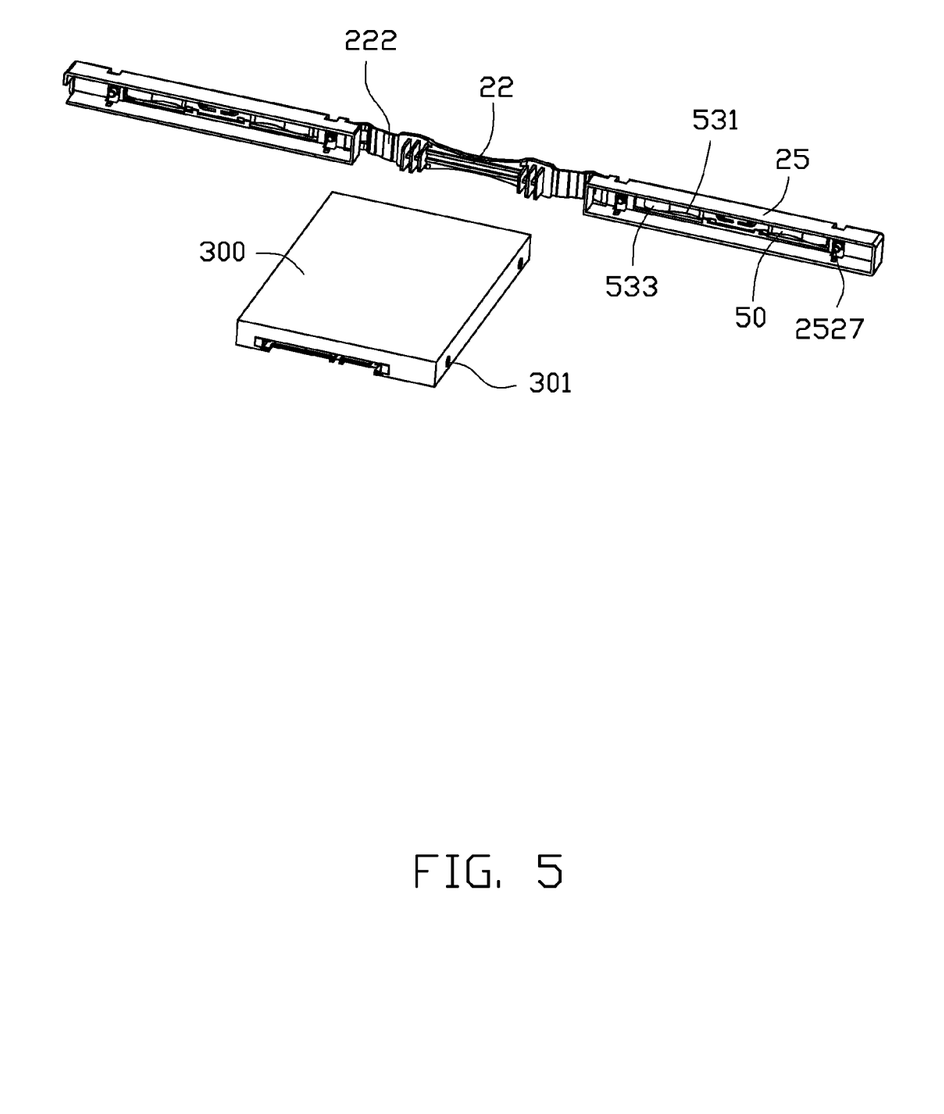
FIG. 5 is similar to FIG. 2, but viewed from another perspective.
Figure 6:
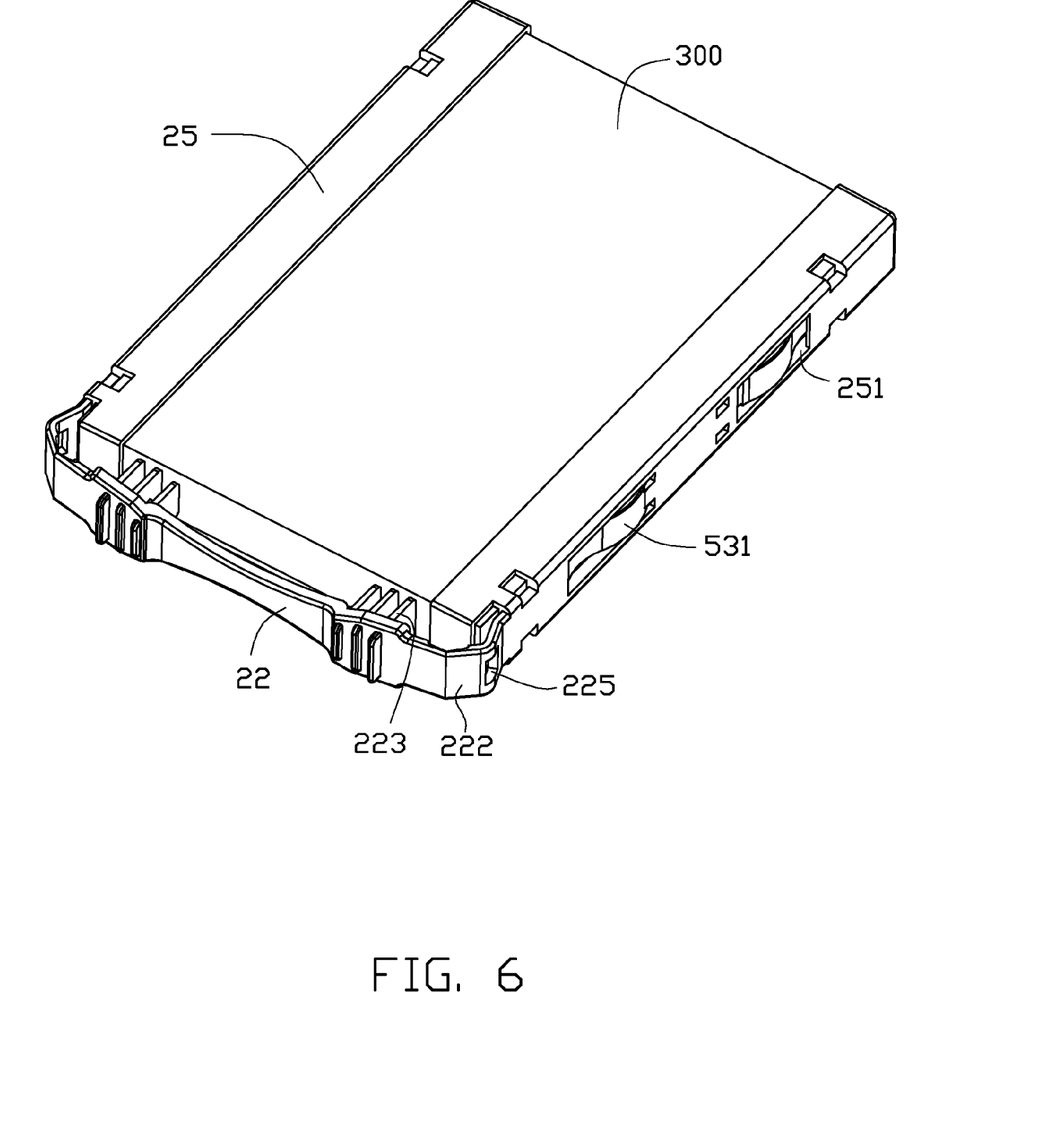
FIG. 6 is an assembled, isometric view of FIG. 2.

FIGS. 2, 3, and 5 show that in assembly of the mounting apparatus 100, the grounding members 50 are received in the mounting slots 2525 of the side brackets 25. The latching pieces 2523 are received in the corresponding cutouts 522 and the first abutting portions 531 are received in the corresponding through slots 2521. The grounding members 50 are slid along the mounting slots 2525 away from the handle 22. The protrusions 526 slidably abut against the inside surfaces of the sidewalls 252, deforming the tongues 525, until the protrusions 526 align with the corresponding positioning holes 2526. The tongues 252 are restored to bias the protrusions 526 to latch in the positioning holes 2526, and the mounting plates 52 are sandwiched between the sidewalls 252 and the corresponding latching pieces 2523. The first abutting portions 531 extend through the through slots 2521 and are exposed from the sidewalls 252, and the second abutting portions 533 are received in the side brackets 25.

FIGS. 1-3, and 4-7 show to mount the hard disk drive 300, the supporting frame 20 is bent about the connection portions 222 to become U-shaped. The slide brackets 25 are attached to the opposite sides of the hard disk drive 300. Parts of the hard disk drive 300 adjacent to the opposite sides of the hard disk drive 300 are received in the side brackets 25, with the positioning pins 2527 engaging in the corresponding fixing holes 301 of the hard disk drive 300, and the second abutting portions 533 abutting against the corresponding sides of the hard disk drive 300. Because the distance between the inside surfaces of the upper and the lower walls 253 and 254 is slightly less than the height of the hard disk drive 300. In addition, the distance between the inside surfaces of the end wall 255 is slightly less than the length of the hard disk drive 300. Therefore, the side brackets 25 are deformed by the hard disk drive 300 to tightly hold the hard disk drive 300. The abutting blocks 223 of the handle 22 abut a front end of the hard disk drive 300, to keep an angle between the handle 22 and the sidewall 252 of each of the side brackets 25 greater than 90 degrees. The grip 221 of the handle 22 is manipulated to slide the supporting frame 20 together with the hard disk drive 300 into the storage rack 500 through the access 510. The first abutting portions 531 slidably abut against inner surfaces of the corresponding side plates 502 of the storage rack 500, until the protrusions 5022 of the storage rack 500 engage in the locking holes 225 of the supporting frame 20. Therefore, the hard disk drive 300 is retained in the storage rack 500. The first abutting portions 531 of the grounding members 50 resiliently abut the corresponding side plates 502 of the storage rack 200, for dampening the shock to the hard disk drive 300, and the second abutting portions 533 of the grounding members 50 resiliently abut the inside surfaces of the sidewalls 252. The hard disk drive 500 is effectively grounded to the storage rack 500 through the grounding members 50.

To detach the hard disk drive 300 from the storage rack 500, the grip 221 of the handle 22 is moved forward to deform the handle 22. The connection portions 222 move inward to make the locking holes 225 of the connection portions 222 disengage from the corresponding protrusions 5022 of the storage rack 500. Therefore, the mounting apparatus 100 together with the hard disk drive 300 is ready to be slid out of the storage rack 500 through the access 510.

It is to be understood, that even though numerous characteristics and advantages of the embodiment have been set forth in the foregoing description, together with details of the structure and function of the embodiment, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A mounting apparatus for mounting a hard disk drive in a storage rack, the mounting apparatus comprising:
   a supporting frame comprising a handle, and two side brackets extending from opposite ends of the handle, and to be attached to opposite sides of the hard disk drive; and
   two grounding members made of resilient and conductive material;
   wherein each grounding member comprises a mounting plate mounted in the corresponding side bracket, and two abutting plates extending out from two opposite ends of the mounting plate, a part of each abutting plate is exposed out of the corresponding side bracket, each abutting plate comprises an arc-shaped first abutting portion extending from the mounting plate and arced toward a first direction, and an arc-shaped second abutting portion extending from a distal end of the first abutting portion and arced toward a second direction opposite to the first direction, when the mounting apparatus mounting the hard disk drive in a storage rack, the first abutting portion is engaged with the storage rack, and the second abutting portion is engaged with the hard disk drive, and wherein each side bracket comprises a sidewall, two pairs of latching pieces are formed in the inner side of each sidewall, the latching pieces and the corresponding sidewall cooperatively bound a mounting slot, the mounting plate of the grounding member is latched in the mounting slot, the inner side of each sidewall defines two positioning holes locating between the latching pieces, two resilient tongues extend from the mounting plate, a protrusion extends out from a distal end of the tongue, to latch in the corresponding position hole of the side bracket.

2. The mounting apparatus of claim 1, wherein the supporting frame is made of plastic or nylon.

3. The mounting apparatus of claim 1, wherein each side bracket further comprises an upper wall perpendicularly extending from a top side of the sidewall, a lower wall perpendicularly extending from a bottom side of the sidewall in a same direction with the upper wall, the hard disk drive is sandwiched between the upper wall and the lower wall, the sidewall defines two spaced through slots, the mounting plate is mounted to an inner side of the sidewall between the two through slots, and the abutting plates are received in the through slots.

4. The mounting apparatus of claim 3, wherein each abutting plate is S-shaped, the first abutting portion of each grounding member extends through the corresponding through slot to abut against the storage rack, and the second abutting portion of each grounding member is received in the side bracket to abut against the hard disk drive.

5. The mounting apparatus of claim 4, wherein the latching pieces are parallel to the sidewall.

6. The mounting apparatus of claim 1, wherein at least one abutting block is formed on the handle to abut against a front end of the hard disk drive, to keep an angle between the handle and each of the side brackets greater than 90 degrees.

7. An assembly, comprising:
   a hard disk drive;
   a mounting apparatus comprising a supporting frame and two grounding members made of resilient and conductive material, wherein the supporting frame comprises a handle, and two lengthwise side brackets extending from opposite ends of the handle, and attached to opposite sides of the hard disk drive; junctions between the handle and the side brackets are pliable; and
   a storage rack receiving the mounting apparatus and the hard disk drive, and comprising a locking portion locked to the handle of the supporting frame;
   wherein each grounding member comprises a mounting plate mounted in the corresponding side bracket, and two abutting plates extending out from two opposite ends of the mounting plate, a part of each abutting plate is exposed out of the corresponding side bracket, each abutting plate comprises an arc-shaped first abutting portion extending from the mounting plate and arced toward a first direction and an arc-shaped second abutting portion extending from a distal end of the first abutting portion and arced toward a second direction opposite to the first direction, a combination of the supporting frame, the grounding members, and the hard disk drive is installed in the storage rack, the first abutting portion is engaged with the storage rack, and the second abutting portion is engaged with the hard disk drive, and wherein each side bracket comprises a sidewall, two pairs of latching pieces are formed in the inner side of each sidewall, the latching pieces and the corresponding sidewall cooperatively bound a mounting slot, the mounting plate of the grounding member is latched in the mounting slot, the inner side of each sidewall defines two positioning holes locating between the latching pieces, two resilient tongues extend from the mounting plate, a protrusion extends out from a distal end of the tongue, to latch in the corresponding position hole of the side bracket.

8. The assembly of claim 7, wherein each side bracket further comprises an upper wall perpendicularly extending from a top side of the sidewall, a lower wall perpendicularly extending from a bottom side of the sidewall in a same direction with the upper wall, the hard disk drive is sandwiched between the upper wall and the lower wall, the sidewall defines two spaced through slots, the mounting plate is mounted to an inner side of the sidewall between the two through slots, and the abutting plates are received in the through slots.

9. The assembly of claim 8, wherein each abutting plate is S-shaped, the first abutting portion of each grounding member extends through the corresponding through slot to abut against the storage rack, and the second abutting portion of each grounding member is received in the side bracket to abut against the hard disk drive.

10. The assembly of claim 9, wherein the latching pieces are parallel to the sidewall.

11. The assembly of claim 8, wherein a plurality of fixing holes is defined in the opposite sides of the hard disk drive, a plurality of positioning pins extends from the sidewalls of the side brackets to correspondingly engage in the plurality of fixing holes of the hard disk drive.

12. The assembly of claim 8, wherein two locking holes are defined in the handle of the mounting apparatus, and adjacent to the side brackets, two protrusions protrude inward from the storage rack to engage in the locking holes of the handle.

13. A mounting apparatus for mounting a hard disk drive in a storage rack, the mounting apparatus comprising:
a supporting frame comprising a handle, and two side brackets extending from opposite ends of the handle, and to be attached to opposite sides of the hard disk drive; and
two grounding members made of resilient and conductive material;
wherein each grounding member comprises a mounting plate mounted in the corresponding side bracket, and two abutting plates extending out from two opposite ends of the mounting plate, a part of each abutting plate is exposed out of the corresponding side bracket, each abutting plate comprises an arc-shaped first abutting portion extending from the mounting plate and arced toward a first direction, and an arc-shaped second abutting portion extending from a distal end of the first abutting portion and arced toward a second direction opposite to the first direction, when the mounting apparatus mounting the hard disk drive in a storage rack, the first abutting portion is engaged with the storage rack, and the second abutting portion is engaged with the hard disk drive, and wherein each side bracket comprises a sidewall, the inner side of each sidewall defines two positioning holes, two resilient tongues extend from the mounting plate, a protrusion extends out from a distal end of the tongue, to latch in the corresponding position hole of the side bracket.

* * * * *